(12) United States Patent
MacDougall et al.

(10) Patent No.: US 8,646,968 B2
(45) Date of Patent: Feb. 11, 2014

(54) METHOD FOR PERFORMING OPTICAL DISTRIBUTED TEMPERATURE SENSING (DTS) MEASUREMENTS IN HYDROGEN ENVIRONMENTS

(75) Inventors: Trevor Wayne MacDougall, Simsbury, CT (US); Paul Eric Sanders, Madison, CT (US)

(73) Assignee: Qorex LLC, Rocky Hill, CT (US)

( * ) Notice: Subject to any disclaimer, the term of this patent is extended or adjusted under 35 U.S.C. 154(b) by 0 days.

(21) Appl. No.: 13/209,015

(22) Filed: Aug. 12, 2011

(65) Prior Publication Data

US 2012/0039360 A1 Feb. 16, 2012

Related U.S. Application Data

(60) Provisional application No. 61/373,364, filed on Aug. 13, 2010, provisional application No. 61/373,349, filed on Aug. 13, 2010, provisional application No. 61/373,394, filed on Aug. 13, 2010, provisional application No. 61/373,442, filed on Aug. 13, 2010.

(51) Int. Cl.
*G01K 11/32* (2006.01)

(52) U.S. Cl.
USPC ........................................... 374/161

(58) Field of Classification Search
USPC ......... 374/130–131, 161, 137, 110, 112, 100, 374/30, 117–119, 45, 46; 356/43, 23, 73.1, 356/32; 385/12
See application file for complete search history.

(56) References Cited

U.S. PATENT DOCUMENTS

| | | | | |
|---|---|---|---|---|
| 6,237,421 B1* | 5/2001 | Li et al. | ............................ | 73/800 |
| 7,008,103 B2* | 3/2006 | MacDougall | ................. | 374/117 |
| 7,170,590 B2* | 1/2007 | Kishida | ............................ | 356/32 |
| 7,245,790 B2* | 7/2007 | Brown et al. | .................... | 385/12 |
| 7,284,903 B2* | 10/2007 | Hartog | ............................ | 374/130 |
| 7,585,107 B2* | 9/2009 | Taverner et al. | ............... | 374/120 |
| 2006/0239330 A1* | 10/2006 | Yamate et al. | ................ | 374/161 |
| 2006/0285850 A1* | 12/2006 | Colpitts et al. | ................ | 398/108 |
| 2007/0242262 A1* | 10/2007 | MacDougall | ................. | 356/73.1 |
| 2008/0273852 A1* | 11/2008 | Parker et al. | ................... | 385/128 |
| 2009/0059996 A1* | 3/2009 | Komeda et al. | ............... | 374/161 |
| 2009/0202192 A1* | 8/2009 | Taverner et al. | ................. | 385/12 |

* cited by examiner

*Primary Examiner* — Lisa Caputo
*Assistant Examiner* — Nasir U Ahmed
(74) *Attorney, Agent, or Firm* — McCormick, Paulding & Huber LLP

(57) ABSTRACT

A method for calculating a temperature along a length of a sensing fiber of a distributed thermal sensing (DTS) system. The sensing fiber, which has two ends, is heat resistant for operation up to 300° C. The DTS system includes a two-channel DTS interrogator that is attached to each of the two ends of the sensing fiber. The DTS interrogator interrogates the sensing fiber from both ends, calculates a temperature difference between co-located positions along the length of the sensing fiber for each end, and determines an error associated with the temperature difference. Based on the determined error, a corrected temperature value along the length of the sensing fiber is calculated and outputted.

13 Claims, 3 Drawing Sheets

METHOD FOR PERFORMING OPTICAL DISTRIBUTED TEMPERATURE SENSING (DTS) MEASUREMENTS IN HYDROGEN ENVIRONMENTS

CROSS REFERENCE TO RELATED PATENT DOCUMENTS

The present application is a non-provisional of and claims the benefit of U.S. Patent Application Ser. No. 61/373,364, filed on Aug. 13, 2010 and incorporates the following patent documents by reference: U.S. Patent Application Ser. No. 61/373,349, filed Aug. 13, 2010 by MacDougall et al., entitled "HIGH TEMPERATURE FIBER OPTIC TURN-AROUND"; U.S. Patent Application Ser. No. 61/373,394, filed on Aug. 13, 2010 by MacDougall et al., entitled "PASSIVATION OF OPTICAL SENSING FIBERS"; and U.S. Patent Application Ser. No. 61/373,442, filed on Aug. 13, 2010 by MacDougall et al., entitled "LOW PROFILE, HIGH TEMPERATURE, HYDROGEN TOLERANT OPTICAL SENSING CABLE".

FIELD OF THE INVENTION

The present invention generally relates to a method for measuring and compensating for loss in optical sensing fibers and, more specifically, to a method for performing optical distributed temperature sensing (DTS) measurements to calculate and correct for loss associated with hydrogen absorption in an optical sensing fiber.

BACKGROUND OF THE INVENTION

The field of Distributed Temperature Sensing (DTS) utilizes sensing fiber optic wires to measure temperatures in remote locations, such as in a pipe or duct. As an example, DTS systems are used in oil, gas and geothermal well environments to determine the temperature along the length of the well.

DTS leverages Raman scattering theory and technology by measuring inelastic scattering of a photon in the sensing fiber to calculate the temperature along the sensing fiber. Raman scattering technology is inherently an intensity-based measurement. More specifically, the derivation of temperature information relies on the measurement of a particular light intensity of two backscattered signals to calculate an intensity ratio of the two backscattered signals and, based on the intensity ratio, derive the desired temperature information. The measurement of the light intensity of the two backscattered signals is very sensitive to errors that can be induced by loss mechanisms not related to temperature.

For instance, when a sensing fiber is exposed to hydrogen, losses are induced from the diffusion of the hydrogen into the glass core of the sensing fiber, which causes the light signal in the sensing fiber to be absorbed. The light absorption properties of the hydrogen are such that they absorb the two backscattered signals differently and, thus, induce a different, direct temperature offset to the calculated value (i.e., different temperature error). The issue of hydrogen diffusion in the sensing fiber is exacerbated in the context of oil, gas and geothermal wells, where hydrogen is present both naturally and in heightened concentrations due to a galvanic reaction of the hydrocarbon well fluids (e.g., oil, gas, etc.) with metal components of the well and DTS system.

As one means of preventing the absorption of hydrogen into the sensing fiber, prior art approaches have encased the sensing fiber of the DTS system in metal structures and specialized coatings to slow down the hydrogen diffusion. By slowing the rate of diffusion of hydrogen into the sensing fiber, the effects of the hydrogen are not seen in a reasonable performance lifetime of the sensing fiber. However, at elevated operating temperatures (e.g., around or above 175° C.), these diffusion barriers or blockers decline in efficacy and the absorption of hydrogen into the sensing fiber becomes a problem. Elevated temperatures in excess of 175° C. are common in the context of some oil, gas and geothermal wells and, thus, attempts to slow or block the absorption of hydrogen have been frustrated.

As an alternative technique, the prior art has modified the material design of the glass of the sensing fiber optic core to greatly minimize reaction with the hydrogen. New core materials, such as a pure $SiO_2$ sensing fiber, eliminate the permanent reaction species, which somewhat reduces the amount of error. Meanwhile, the new core materials continue to allow the reversible absorption effects of hydrogen, which produces unacceptable amounts of error. In short, the new core materials fail to completely eliminate the problem of hydrogen absorption into the sensing fiber.

As one means of compensating for the seemingly-inevitable absorption of the hydrogen into the sensing fiber, prior art techniques have interrogated the sensing fiber to correct for the absorption of hydrogen therein. For example, techniques are known to use either a partial loop architecture or a full loop architecture to interrogate the loss characteristics of the sensing fiber.

Referring to FIG. 1, according to the partial loop architecture, a single-channel optical DTS interrogator 10 measures the temperature of a sensing fiber 12 at two sensing points $Z^I$ ($I_1$), $Z^{II}$ ($I_1+I_2$) spaced apart around the sensing fiber. The two points $Z^I$ and $Z^{II}$ are designed to be co-located along a partial looped portion of the sensing fiber 12. Thus it is presumed that the temperature measured at the two co-located sensing points $Z^I$, $Z^{II}$ should be the same. Based on this presumption, any difference in measurement can be attributed to non-temperature loss or error. For instance, from the interrogation, information is derived regarding absolute loss or error that occurs on an intermediate portion ($I_2$) 14 of the sensing fiber 12 that is between the two co-located sensing points $Z^I$, $Z^{II}$. This derived information is used to compensate for the error and calculate an approximate temperature along the length of the sensing fiber 12.

The partial loop architecture also operates under the assumption that both legs (i.e., the co-located halves of the intermediate portion 14) of the sensing fiber 12 have the same loss over a section of the sensing fiber 12 that is covered by both legs. However, this is not always the case. In fact, asymmetrical loss is common and can have a significant impact on the calculated temperature.

Referring to FIG. 2, in a full loop architecture, a two-channel interrogator 20 measures the temperature of a full-looped sensing fiber 22 at a single point $Z^{III}$ ($I_3$, $I_4$), but from both ends (i.e., opposing directions). Based on the measured temperatures, the loss of each wavelength is reconstructed and the absolute loss or error in the sensing fiber 22 is determined. The temperature along the sensing fiber 22 is then calculated based on the determined error.

However, neither the partial loop architecture nor the full loop architecture compensates for the entire problem of loss the sensing fiber 12, 22. For instance, both architectures use calculations that rely on averaging of the loss in the sensing fiber 12, 22. As a result, neither of the architectures accounts for non-uniform distribution of DFA and sources such as modal loss that is dynamic, which results in measurement error along discrete points of the sensing fiber.

The object of the present invention is, therefore, to provide a method for DTS measurement, which, among other desirable attributes, significantly reduces or overcomes the above-mentioned deficiencies of known DTS methods.

SUMMARY OF THE INVENTION

Accordingly, the present invention provides a method and system for calculating and correcting for non-temperature related differential loss in a sensing fiber, such as hydrogen-induced loss.

In an aspect of the present invention, a method is provided for determining non-temperature related differential loss in a sensing fiber based on the measured temperature readings of the sensing fiber.

In an aspect of the present invention, a method is provided that interrogates a sensing fiber loop from two opposite directions. The method of interrogation measures the temperature along the sensing fiber from each end. The method further determines differences in measured temperatures at pairs of co-located sensing points (i.e., differences in temperatures measured at each point in each direction or from each end, as well as differences between points in each co-located pair of points). Based on the temperature differences the method determines, at each point, an error that is associated with non-temperature induced loss, such as hydrogen absorption. The method compensates for the error in order to calculate an estimated temperature along the length of the sensing fiber.

In another aspect of the present invention, a DTS system is provided that has a DTS interrogator and a sensing fiber. The DTS system measures and compensates for a temperature error that is assumed to be induced by non-temperature related differential loss in the sensing fiber exposed to an environment with temperatures up to 300° C.

In an aspect of the present invention, the DTS system interrogates a sensing cable having high temperature components capable of performance up to 300° C. The sensing cable has a hydrogen resistant sensing fiber. By "hydrogen resistant", it is meant that the component tolerates the presence of hydrogen at high temperatures, such as up to 300° C., and is, generally, not susceptible to the irreversible effects of hydrogen chemically reacting with the core of the sensing fiber. The sensing fiber has a core made of pure silica. The sensing cable also has a hydrogen-resistant sheath, metal tube and armor casing.

These and other features of the present invention are described with reference to the drawings of preferred embodiments of a method for performing DTS sensing in hydrogen environments.

BRIEF DESCRIPTION OF THE DRAWINGS

The illustrated embodiments of the method and system of the present invention are intended to illustrate, but not limit, the invention.

DETAILED DESCRIPTION OF THE PREFERRED EMBODIMENTS

Figure 1:
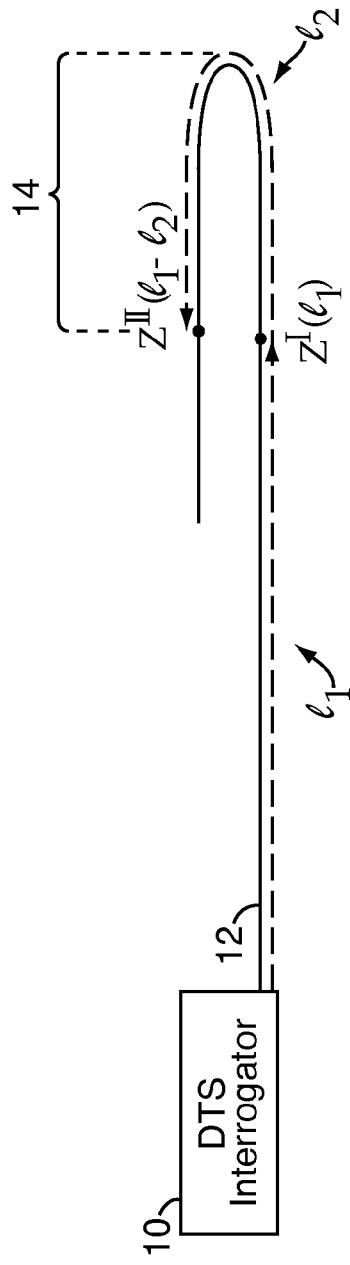
FIG. 1 illustrates a partial turn around or partial loop architecture of distributed temperature sensing (DTS) known in the art.
Figure 2:
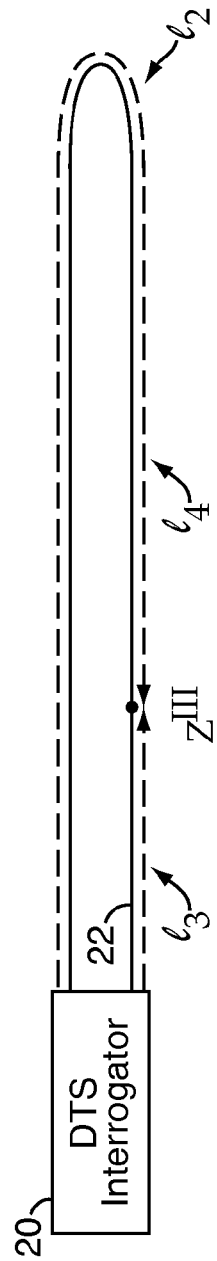
FIG. 2 illustrates a full turn around or full loop architecture of DTS known in the art.
Figure 3:
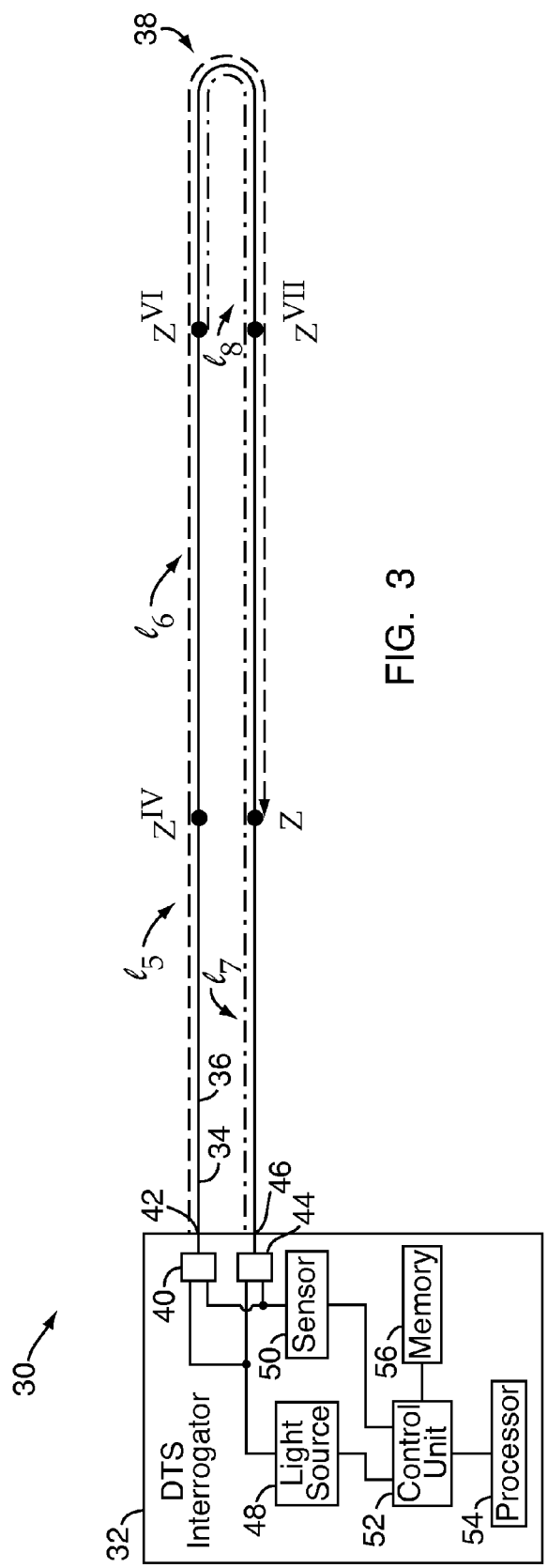
FIG. 3 illustrates a DTS system according to the present invention.

Referring to FIG. 3, a distributed temperature sensing (DTS) system 30 is shown. The DTS system 30 includes a DTS interrogator 32 that has two-channel capacity and a sensing cable 34 that includes a sensing fiber 36 with a turnaround 38. The turnaround 38 has a modal filter integrated therein. A first channel 40 of the DTS interrogator 32 is connected to a first end 42 of the sensing fiber 36. A second channel 44 of the DTS interrogator 32 is connected to a second end 46 of the sensing fiber 36. A complete optical path is formed between the two channels 40, 44 of the DTS interrogator 32 through the sensing fiber 36 and the turnaround 38.

The sensing fiber 36 is made of pure silica, which has hydrogen resistant characteristics, and is enclosed with a heat- and hydrogen-resistant sheath. By "hydrogen resistant", it is meant that the sensing fiber 36 is designed to tolerate the presence of hydrogen at high temperatures, such as up to 300° C., and is, generally, not susceptible to the irreversible effects of hydrogen chemically reacting with the core of the sensing fiber. In certain embodiments the sensing fiber has a pure silica core that does not react with hydrogen. In certain embodiments, the sensing fiber 36 is provided with a passivation treatment, for instance, as disclosed in U.S. Application No. 61/373,394, which is incorporated herein by reference. The sensing fiber 36 is covered by a metal tube and an armor casing and includes the turnaround 38 as disclosed in U.S. Application No. 61/373,349, which is incorporated herein by reference. In certain embodiments, the sensing fiber 36, the sheath, the metal tube and the armor casing are each heat resistant and, together, form the sensing cable 34.

The DTS interrogator 32 has a light source 48 that generates a light signal at each of the channels 40, 44, the light signal being transmitted down the sensing fiber 36. The DTS interrogator 32 also has a sensor 50 that measures the light signals returned at each of the channels 40, 44 from the sensing fiber 36.

The DTS interrogator 36 includes a control unit 52 having a processor 54 that is electrically connected to the light source 48, the sensor 50 and memory 56 of the control unit 52. Protocols and algorithms of methods of the present invention, as discussed below, are stored in the memory 56 and processed by the processor 52.

Figure 4:
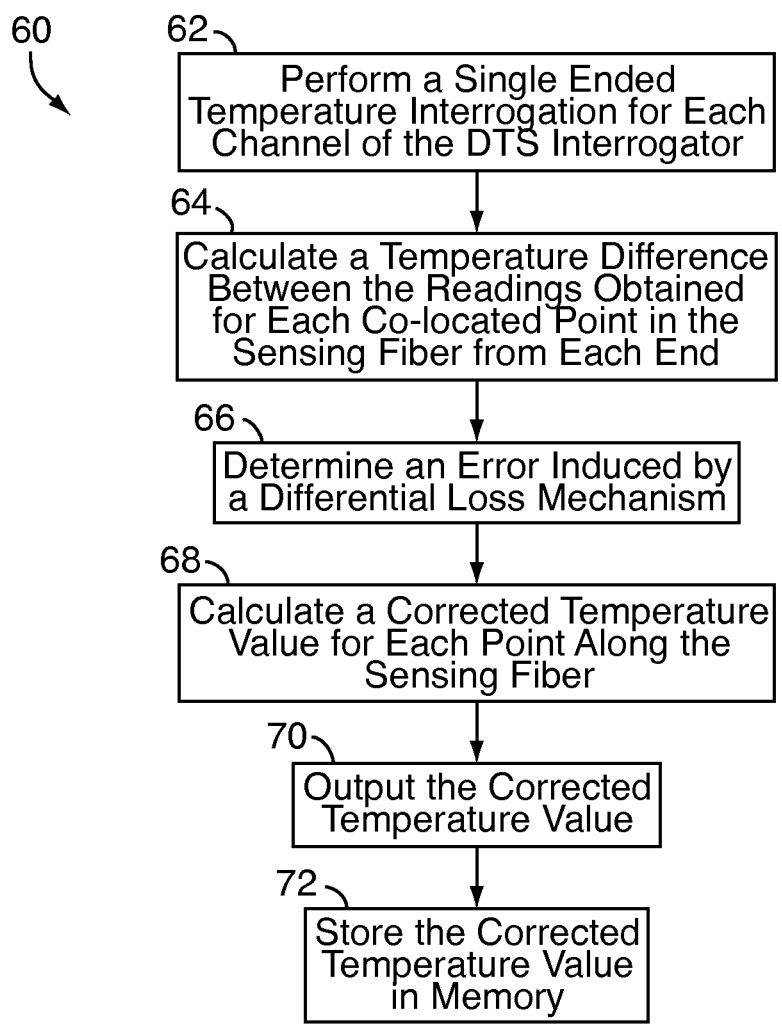
FIG. 4 illustrates a method of calculating and compensating for non-temperature related differential loss in a sensing fiber having two ends according to the present invention.

Referring to FIG. 4, a method for performing DTS sensing in hydrogen environments is shown at 60. Using the DTS interrogator 32, a single ended temperature interrogation is performed (box 62) for each channel 40, 44 of the DTS interrogator 32. The received raw temperature data received by the sensor 50 is stored in the memory 56 for processing.

The processor 54 calculates (box 64) a temperature difference between the readings obtained for each co-located sensing point in the sensing fiber 36 from each end 42, 46, which are associated with one of the channels 40, 44, separately. For example, the temperature differences between $Z^{IV}$ ($I_5$) and $Z^V$ ($I_5+I_6$) for channel 40 as well as $Z^{VI}$ ($I_7$) and $Z^{VII}$ ($I_7+I_8$) for channel 44 are calculated. Theoretically, the temperature reading from each end 42, 46 should be the same for each of the co-located sensing points along the length of the sensing fiber 36. However, if the temperature readings at a particular co-located sensing point are not the same from both of the ends 42, 46, this is considered a temperature error and is assumed to be induced by non-temperature related differential loss in the sensing fiber 36, such as hydrogen absorption.

Based on the calculated temperature difference, the processor 54 determines (box 66) an error induced by a differential loss mechanism, such as hydrogen absorption in the sensing fiber 36. In particular, the determination is based on the raw temperature data, the calculated temperature differences for each end 42, 46, taken separately, and the calculated temperature differences for each end 42, 46, taken together. The determined error provides a more complete and accurate profile of the differential loss along the sensing fiber 36 than is possible using known DTS methods.

Then, based on both the interrogated raw temperature data and the determined error, the processor 36 calculates (box 68) a corrected temperature value for each point (e.g., $Z^{IV}$ and $Z^{V}$; $Z^{VI}$ and $Z^{VII}$) along the sensing fiber 36.

The corrected temperature value is outputted (box 70) for immediate use, such as a central monitoring system that is regulating operation of the well.

The corrected temperature value is also stored (box 72) in the memory 56 or an external storage device for calibration and testing purposes.

By comparing the temperature readings of co-located positions from each end 42, 46, separately, more accurate results are achieved than by known DTS systems. For instance, in a test, the temperature readings acquired according to the method 60 of the present invention were accurate to within ±1.7° C. (3σ) over a 1,200 m sensing fiber exposed to an operating environment of an average temperature of 220° C.

It should be understood that the foregoing description is only illustrative of the invention. Various alternatives and modifications can be devised by those skilled in the art without departing from the broader aspects of the present invention.

What is claimed is:

1. A method for distributed temperature sensing using Raman scattering in an optical fiber loop disposed in a sensing environment, comprising:
    interrogating a first end of the optical loop with one or more light signals, and
    interrogating a second end of the optical loop with one or more light signals;
    measuring at a first sensor channel an intensity of Raman backscattered light signals returned to the first end of the optical loop, and measuring at a second sensor channel an intensity of Raman backscattered light signals returned to the second end of the optical loop;
    calculating, from measurements made by each first or second sensor channel, a corresponding first or second plurality of temperature readings corresponding to each of a plurality of points around the optical loop;
    calculating, based on the first and second pluralities of temperature readings, a plurality of temperature differences corresponding to pairs of points that are co-located along the optical loop; and
    determining, based on the plurality of temperature differences, a plurality of non-temperature errors corresponding to the plurality of points around the optical loop.

2. A method as claimed in claim 1, wherein the plurality of temperature differences include temperature differences based on the first plurality of raw temperature readings for each co-located pair of sensing points.

3. A method as claimed in claim 1, wherein the plurality of temperature differences include temperature differences based on the second plurality of raw temperature readings for each co-located pair of sensing points.

4. A method as claimed in claim 1, wherein the plurality of temperature differences include temperature differences based on the first and second pluralities of raw temperature readings for each sensing point.

5. A method as claimed in claim 1, wherein the plurality of non-temperature errors correspond to differential losses in the optical fiber loop.

6. A method as claimed in claim 1, wherein the plurality of non-temperature errors correspond to differential losses in the optical fiber loop at temperatures up to 300° C.

7. A method as claimed in claim 1, wherein the plurality of non-temperature errors correspond to differential losses in the optical fiber loop constructed of hydrogen resistant pure silica core optical fiber.

8. A method as claimed in claim 1, in which the optical fiber loop is disposed in a hydrogen environment.

9. An apparatus for distributed temperature sensing in a sensing environment, comprising:
    an optical fiber formed in an elongated loop with first and second ends adjacent to each other; and
    an optical interrogator having a first sensor channel and a first light source in communication with the first end of the optical fiber, and having a second sensor channel and the first or a second light source in communication with the second end of the optical fiber,
    the optical interrogator including a control unit configured to transmit a first light signal around the optical fiber loop from the first end to the second sensor channel, and to transmit a second light signal around the optical fiber loop from the second end to the first sensor channel,
    the control unit further configured to calculate, from intensity measurements of Raman scattered light signals made at the first and second sensor channels, first and second pluralities of raw temperature readings corresponding to interaction of the light signals with each of a plurality of sensing points around the optical fiber loop,
    the control unit further configured to calculate, based on the first and second pluralities of raw temperature readings, a plurality of temperature differences corresponding to pairs of the plurality of sensing points that are co-located around the optical fiber loop, and
    the control unit further configured to determine, based on the plurality of temperature differences at the pairs of co-located sensing points, a plurality of non-temperature errors corresponding to the plurality of sensing points.

10. An apparatus as claimed in claim 9, wherein the plurality of sensing points include pairs of sensing points co-located along the optical fiber loop, and the plurality of temperature differences include temperature differences based on the first plurality of raw temperature readings for each co-located pair of sensing points.

11. An apparatus as claimed in claim 9, wherein the plurality of sensing points include pairs of sensing points co-located along the optical fiber loop, and the plurality of temperature differences include temperature differences based on the second plurality of raw temperature readings for each co-located pair of sensing points.

12. An apparatus as claimed in claim 9, wherein the plurality of temperature differences include temperature differences based on the first and second pluralities of raw temperature readings for each sensing point.

13. An apparatus as claimed in claim 9, wherein the optical fiber loop is constructed of hydrogen resistant pure silica core optical fiber.

* * * * *